(12) United States Patent
Ooami

(10) Patent No.: US 9,632,340 B2
(45) Date of Patent: Apr. 25, 2017

(54) DISPLAY DEVICE

(71) Applicant: Japan Display Inc., Minato-ku (JP)

(72) Inventor: Yukio Ooami, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/708,747

(22) Filed: May 11, 2015

(65) Prior Publication Data

US 2015/0355496 A1    Dec. 10, 2015

(30) Foreign Application Priority Data

Jun. 5, 2014   (JP) .................. 2014-116920
Mar. 10, 2015  (JP) .................. 2015-047329

(51) Int. Cl.
*G02F 1/1333*   (2006.01)

(52) U.S. Cl.
CPC .............. *G02F 1/133308* (2013.01); *G02F 2001/13332* (2013.01); *G02F 2001/133314* (2013.01); *G02F 2201/46* (2013.01); *G02F 2202/28* (2013.01)

(58) Field of Classification Search
CPC ........... G02F 1/133308; G02F 2201/46; G02F 2001/133314
See application file for complete search history.

(56) References Cited

U.S. PATENT DOCUMENTS

| | | | | | |
|---|---|---|---|---|---|
| 2001/0002145 | A1* | 5/2001 | Lee | .................. | G02F 1/133308 349/58 |
| 2005/0024573 | A1* | 2/2005 | Suzuki | .............. | G02F 1/133308 349/149 |
| 2006/0133018 | A1* | 6/2006 | Okuda | .............. | G02F 1/133308 361/679.26 |
| 2007/0002206 | A1* | 1/2007 | Shirai | ............... | G02F 1/133308 349/58 |
| 2008/0030643 | A1* | 2/2008 | Choi | .................. | G02F 1/13452 349/58 |
| 2008/0192168 | A1* | 8/2008 | Sudo | ................. | G02F 1/133308 349/58 |
| 2009/0122520 | A1* | 5/2009 | Kuroiwa | ........... | G02F 1/133608 362/97.2 |
| 2010/0165244 | A1* | 7/2010 | Shin | .................. | G02F 1/133308 349/62 |
| 2010/0225613 | A1* | 9/2010 | Iwasaki | ............... | G02F 1/13338 345/174 |

(Continued)

FOREIGN PATENT DOCUMENTS

JP    2013-044944    3/2013

*Primary Examiner* — Sang V Nguyen
(74) *Attorney, Agent, or Firm* — Oblon, McClelland, Maier & Neustadt, L.L.P.

(57) ABSTRACT

A display device according to an embodiment includes a display panel, a first supporting member and a second supporting member that support the display panel, the first supporting member and the second supporting member being disposed so as to sandwich the display panel from a front surface side and a back surface side, the first supporting member and the second supporting member being mated with each other in a mated section, and a bonding member disposed so as to cover the mated section, the bonding member bonding the first supporting member and the second supporting member together, in which a non-adhesive region is formed in a region on an adhesive surface of the bonding member, the region facing the mated section.

5 Claims, 4 Drawing Sheets

(56) References Cited

U.S. PATENT DOCUMENTS

| | | | |
|---|---|---|---|
| 2012/0242925 A1* | 9/2012 | Watanabe | G02F 1/133308 349/58 |
| 2014/0176872 A1* | 6/2014 | Miyazaki | G02B 6/0088 349/65 |
| 2015/0248035 A1* | 9/2015 | Kubo | H04N 5/44 348/725 |
| 2015/0296634 A1* | 10/2015 | Itoh | G02F 1/133308 361/679.01 |

* cited by examiner

FIG. 1A
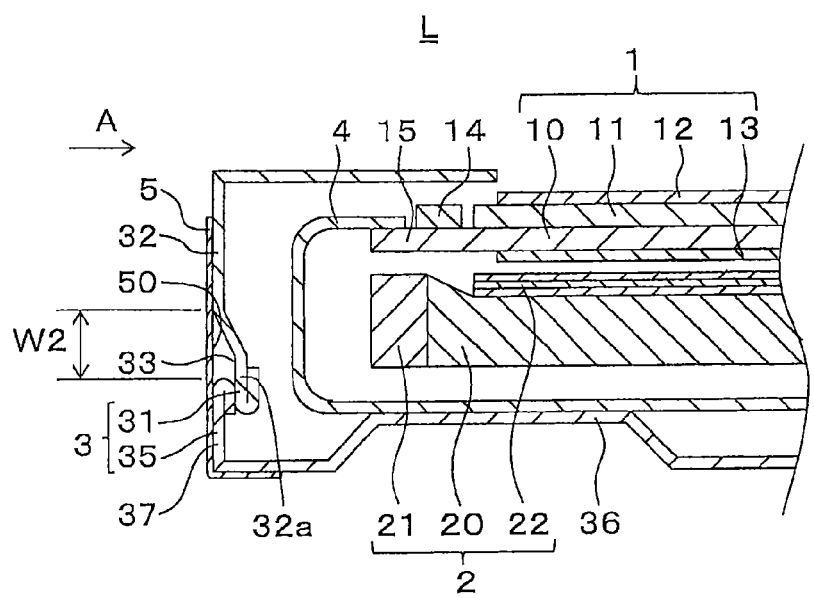
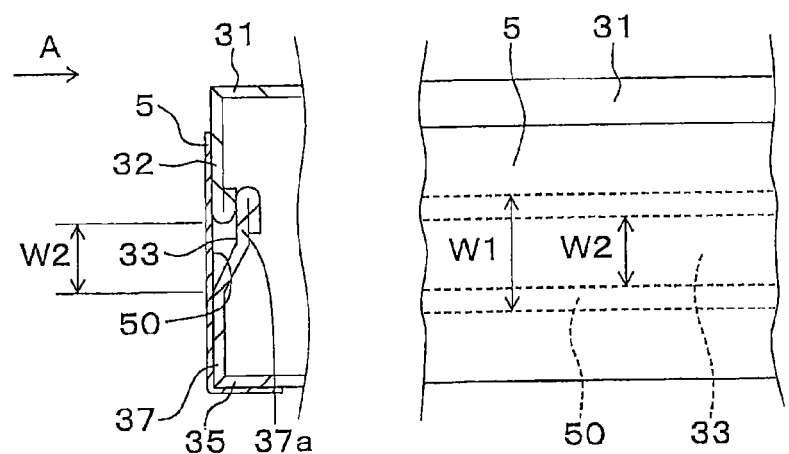
FIG. 1B
FIG. 1C

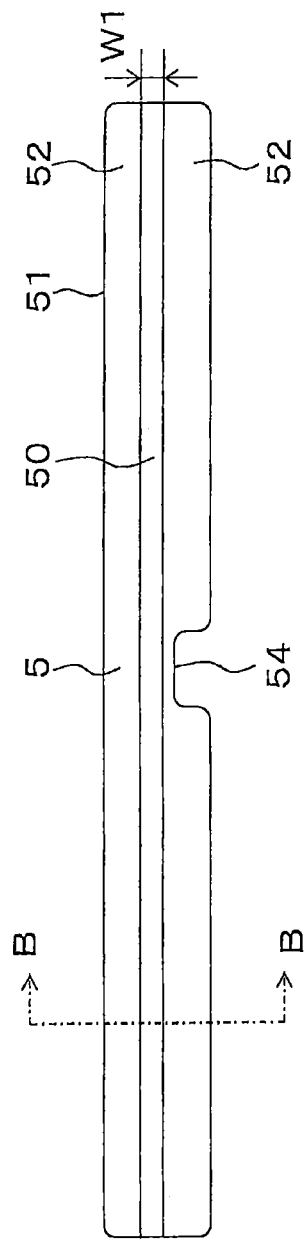

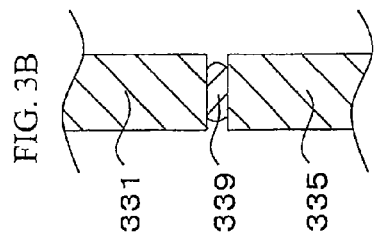
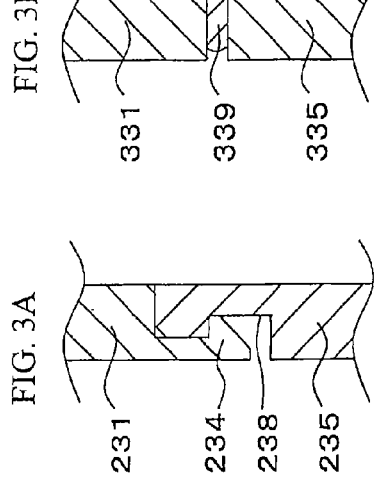
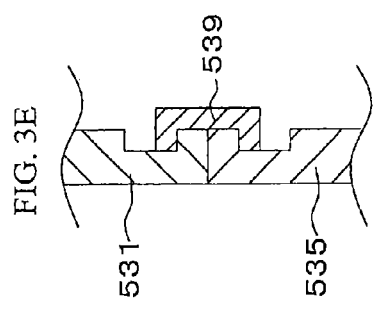
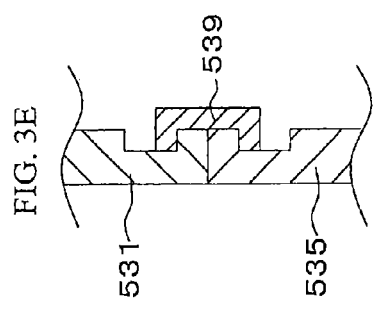
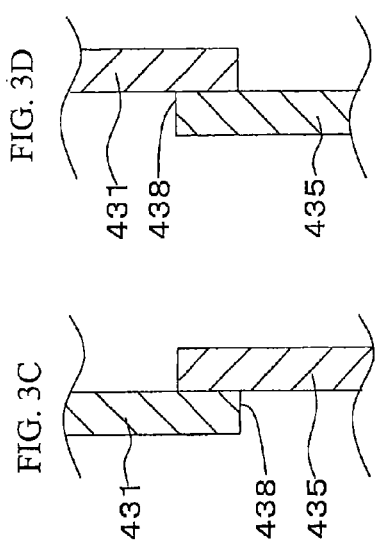

DISPLAY DEVICE

CROSS-REFERENCES TO RELATED APPLICATION

This application is based upon and claims the benefit of priority from Japanese Patent Applications No. 2014-116920 filed on Jun. 5, 2014 and No. 2015-047329 filed on Mar. 10, 2015; the entire contents of which are incorporated herein by reference.

BACKGROUND OF THE INVENTION

Field of the Invention

An embodiment of the present invention relates to a display device.

Background Art

As shown in FIG. 4, a display device such as a liquid crystal display device includes a display panel 101 and a flexible printed circuit substrate 104 connected to the display panel 101, and the like accommodated in a bezel. As shown in the drawing, the flexible printed circuit substrate 104 may be bent on the side of the display panel 101 to go around the back surface side of the display panel 101 (see, for example, FIG. 2 in JP-A-2013-44944).

Two types of bezels are used: a front bezel 131 supporting the display surface side of the display panel 101 and a rear bezel 135 supporting the back surface side of the display panel 101. The front bezel 131 and the rear bezel 135 are engaged with each other (see, for example, FIG. 1 in Domestic Re-publication of PCT Application No. 2007-094095). This engagement is made in such a way that one of the front bezel 131 and the rear bezel 135 covers the outer surface of the other. In the case shown in FIG. 4, the front bezel 131 is engaged with the rear bezel 135 in such a way that the rear bezel 135 covers the outer surface of the front bezel 131. A tape 105 is affixed across the front bezel 131 and the rear bezel 135 to fix these bezels.

A step is present between the upper end of the side wall of the rear bezel 135 and the side wall of the front bezel 131 and a concavity 133 is formed. Accordingly, the tape 105 may be affixed to the surface of the concavity 133 when the worker pushes the tape 105 during affixing of the tape 105 to the engagement section or peripheral buffer material or the like pushes the tape 105 during transfer of the liquid crystal display device to which the tape 105 has been affixed. Concurrently with this, when a force is applied so that the front bezel 131 and the rear bezel 135 push against each other and the front bezel 131 and the rear bezel 135 deviate close to each other, the tape 105 is affixed to the surface of the concavity 133 in this state and, even after the force is released, the adhesion of the tape 105 may retain the deviation. This applies a stress to the front bezel 131 or the rear bezel 135 and the stress is transferred to the inside of the liquid crystal display device, possibly degrading the display quality of the display panel 101.

For example, in a liquid crystal display device in which the flexible printed circuit substrate 104 goes around the back surface side of the display panel 101 and is in contact with or close to the rear bezel 135 as shown in FIG. 4, when the tape 105 is affixed to the surface of the concavity 133, the rear bezel 135 may be contorted so as to be lifted toward the front bezel 131. Then, the rear bezel 135 pushes and lifts the flexible printed circuit substrate 104 and a stress is transferred from the flexible printed circuit substrate 104 to the display panel 101. As a result, inconsistencies in brightness are caused on the display panel 101.

An object of the invention is to provide a display device including a front bezel, a rear bezel mated with the front bezel in a mated section, and a tape covering the mated section, in which the tape is not easily affixed to the surface of a concavity formed in the mated section.

BRIEF DESCRIPTION OF THE DRAWINGS

FIG. 1A is a partial sectional view of a liquid crystal display device L according to an embodiment.

FIG. 1B is a partial sectional view of the liquid crystal display device L showing another form of an engagement section.

FIG. 1C is a side view seen from a direction A.

FIG. 2A is a front view of a tape 5 seen from an adhesive surface side.

FIGS. 2B and 2C are sectional views of a section B-B in FIG. 2A.

FIGS. 3A to 3E are partial sectional views showing how a first supporting member is mated with a second supporting member. The left side in these drawings corresponds to the outside of the liquid crystal display device L and the right side corresponds to the inside of the liquid crystal display device L.

DETAILED DESCRIPTION OF THE INVENTION

Figure 4:
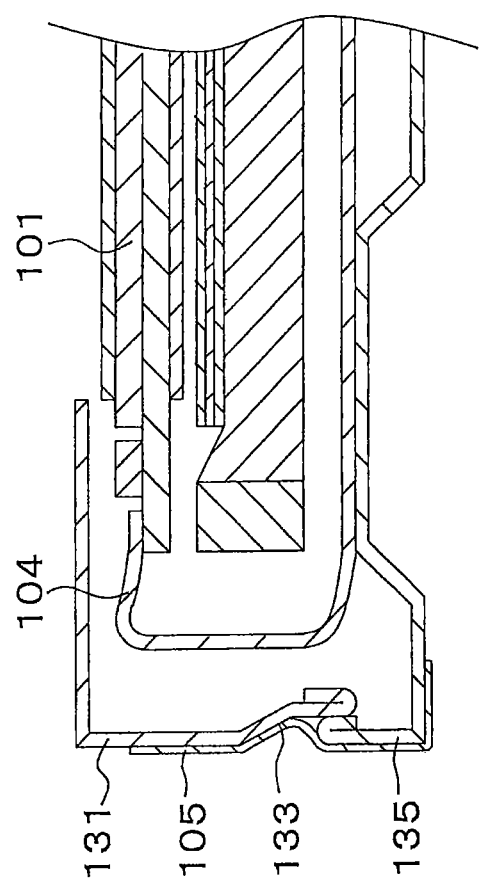
FIG. 4 is a partial sectional view of a conventional liquid crystal display device.

A display device according to an embodiment includes a display panel, a first supporting member and a second supporting member that support the display panel, the first supporting member and the second supporting member being disposed so as to sandwich the display panel from a front surface side and a back surface side, the first supporting member and the second supporting member being mated with each other in a mated section, and a bonding member disposed so as to cover the mated section, the bonding member bonding the first supporting member and the second supporting member together, in which a non-adhesive region is formed in a region on an adhesive surface of the bonding member, the region facing the mated section.

The liquid crystal display device L according to the embodiment will be described with reference to the drawings. In the drawings, the width, thickness, and shape of each component may be schematically indicated to clarify the description. The drawings are only examples and do not limit the understanding of the invention. In the following description, the terms "upper" and "lower" may be used. The term "upper" corresponds to the display surface side of the liquid crystal display device L. The term "lower" corresponds to the back surface side of the liquid crystal display device L.

As shown in FIG. 1A, the liquid crystal display device L according to the embodiment includes a liquid crystal cell 1 as a display panel and a backlight unit 2 provided on the back surface side of the display panel and these components are accommodated in a bezel 3.

The liquid crystal cell 1 includes an array substrate 10, a counter substrate 11 disposed on its display surface side, and polarizing plates 12 and 13 disposed on the display surface side of the counter substrate 11 and the back surface side of the array substrate 10. The array substrate 10 has an extension portion 15 lengthened in at least one direction beyond the counter substrate 11. An IC chip 14 incorporating a liquid crystal drive circuit is disposed on the display surface side of the extension portion 15.

In addition, a flexible printed circuit substrate 4 is connected to the extension portion 15. The flexible printed circuit substrate 4 extends opposite to the display region of the liquid crystal cell 1 from the extension portion 15, is curved or bent downward, and goes around the back surface side of the backlight unit 2. An end of the flexible printed circuit substrate 4 is connected to a power supply circuit.

The backlight unit 2 includes a light guide plate 20, a light source 21 provided at one end of the light guide plate 20, and a plurality of optical sheets 22 laminated on the display surface side of the light guide plate 20.

The bezel 3 includes a front bezel 31 as the first supporting member and a rear bezel 35 as the second supporting member. The front bezel 31 covers the display surface sides of the liquid crystal cell 1 and the backlight unit 2. A portion 32*a* of a side wall 32 of the front bezel 31 close to the rear bezel 35 is recessed inward. The rear bezel 35 covers the back surface sides of the liquid crystal cell 1 and the backlight unit 2. A proximity section 36 is formed close to the flexible printed circuit substrate 4 in a portion of the rear bezel 35 corresponding to the back surface side of the backlight unit 2. The proximity section 36 is formed by recessing a part of the rear bezel 35 inward of the liquid crystal display device L. The front bezel 31 is engaged with the rear bezel 35. Specifically, the front bezel 31 is engaged with the rear bezel 35 by covering a part of the portion 32*a* of the front bezel 31 close to the rear bezel 35 with a portion of the rear bezel 35 close to the upper end of a side wall 37. A concavity 33 that is recessed inward from the side of the liquid crystal display device L is formed by the upper end of the side wall 37 of the rear bezel 35 and the portion 32*a* of the front bezel 31 close to the rear bezel 35.

However, the relationship between the front bezel 31 and the rear bezel 35 in engagement may be reversed. That is, as shown in FIG. 1B, a portion 37*a* of the side wall 37 of the rear bezel 35 close to the front bezel 31 may be recessed inward and a part of this portion may be covered with a portion of the side wall 32 of the front bezel 31 close to the lower end, so that the bezels are engaged together. Also in this case, the concavity 33 recessed inward from the side of the liquid crystal display device L is formed by the lower end of the side wall 32 of the front bezel 31 and the portion 37*a* of the side wall 37 of the rear bezel 35 close to the front bezel 31.

This type of concavity 33 may be formed, for example, around the sides of the liquid crystal display device L, in two opposing side walls of the liquid crystal display device L (that is, in sections corresponding to two opposing sides when the liquid crystal display device L is seen from the display surface side), or in only one side wall (that is, in only one section corresponding to one side when the liquid crystal display device L is seen from the display surface side).

The tape 5 as a bonding member is affixed so as to cover the engagement section between the front bezel 31 and the rear bezel 35. The engagement section means a section exposed externally in a border section or a section concerning the structure of engagement between the front bezel 31 and the rear bezel 35, and the engagement section in the embodiment is the concavity 33. As shown in FIGS. 2A to 2C, in the tape 5, an adhesive 52 is applied to a back surface of a main sheet 51 to form an adhesive surface and a non-adhesive region 50 is formed in a part of the adhesive surface. Although the structure and material of the main sheet 51 is not limited, the main sheet 51 may be made of, for example, a conductive material or a synthetic resin, or may be formed by laminating these materials.

The non-adhesive region 50 extending horizontally is formed on the adhesive surface of the tape 5. The non-adhesive region 50 is a region that does not adhere to the bezel 3. The non-adhesive region 50 is formed by, for example, removing the adhesive 52 in a region corresponding to the non-adhesive region 50 after applying the adhesive 52 to the entire back surface of the main sheet 51. Alternatively, the non-adhesive region 50 may be formed by applying the adhesive 52 to a region excluding the non-adhesive region 50 on the back surface of the main sheet 51. When the non-adhesive region 50 is formed by using these methods, the adhesive 52 is not present in the non-adhesive region 50, as shown in FIG. 2B. Alternatively, as shown in FIG. 2C, the non-adhesive region 50 may be formed by affixing a protective cover 53 with no adherence or relatively weaker adherence than adherence of the adhesive 52 to a region on the adhesive surface of the main sheet 51 corresponding to the non-adhesive region 50. The protective cover 53 may be a resin film, a resin film on which layers such as a printing layer have been laminated as necessary, or the like. The protective cover 53 preferably has higher stiffness than the main sheet 51.

As shown in FIG. 2A, a concavity 54 may be provided in a part (in the middle in the longitudinal direction of the tape 5 in the case of FIG. 2A) of the tape 5 to prevent contact with other parts of the liquid crystal display device L or to facilitate bending at a corner of the bezel 3 during affixation. The concavity 54 is not necessarily present.

This type tape 5 is affixed so that its non-adhesive region 50 covers the concavity 33. The tape 5 does not make contact with the internal surface of the concavity 33. The concavity 33 generally extends in a direction orthogonal to the vertical direction of the liquid crystal display device L. In this case, the tape 5 is affixed so that the direction in which the concavity 33 extends matches the direction in which the non-adhesive region 50 extends. As shown in FIG. 1C, a width W1 (length in a direction orthogonal to the direction in which the non-adhesive region 50 extends) of the non-adhesive region 50 of the tape 5 may be longer than a distance W2, which is the distance in the vertical direction (direction orthogonal to the direction in which the concavity 33 extends) of the concavity 33. In this case, the non-adhesive region 50 can cover the concavity 33 even when the tape 5 deviates from an ideal position, the length W2 in the vertical direction of the concavity 33 varies, or the formation position of the non-adhesive region 50 in the tape 5 deviates during affixation of the tape 5.

In the liquid crystal display device L with the above structure, the non-adhesive region 50 is formed on the adhesive surface of the tape 5 and the concavity 33 is covered with the non-adhesive region 50. Accordingly, the tape 5 is prevented from being affixed to the internal surface of the concavity 33 and, even when a force for pushing the front bezel 31 and the rear bezel 35 against each other is applied and these bezels deviate closer to each other, a return after the deviation cannot be prevented. Therefore, it is possible to prevent degradation of the display quality of the liquid crystal cell 1, which is caused by transfer of such a stress to the liquid crystal cell 1 via a member in the liquid crystal display device L.

Particularly in the liquid crystal display device L according to the above embodiment with a structure in which the flexible printed circuit substrate 4 goes around the back surface side of the backlight unit 2, since the rear bezel 35 is contact with or close to the flexible printed circuit substrate 4, the stress applied to the rear bezel 35 is easily transferred to the liquid crystal cell 1 via the flexible printed circuit substrate 4. However, when the tape affixed across the front bezel 31 and the rear bezel 35 is the tape 5 above, application of the stress to the rear bezel 35 is prevented and application of the stress to the liquid crystal cell 1 is prevented, thereby preventing degradation of the display quality of the liquid crystal cell 1.

When the non-adhesive region 50 of the tape 5 is formed by affixing the protective cover 53 in the region, the tape 5 is not easily recessed inward of the concavity 33 of the front bezel 31 even when the tape 5 is pushed from the outside since the non-adhesive region 50 has high stiffness. This further prevents a stress from being applied to the front bezel 31 and the rear bezel 35. Particularly when the protective cover 53 has higher stiffness than the main sheet 51, this effect is larger.

When the tape 5 includes a conductive material, leakage of electromagnetic noise can be prevented.

Although the front bezel 31 as the first supporting member is engaged with the rear bezel 35 as the second supporting member in the above embodiment, the front bezel 31 only needs to be mated with the second supporting member instead of being engaged. "The first supporting member is mated with the second supporting member" means that the first supporting member is connected to the second supporting member without being detached. Examples of mating are shown below. In FIG. 3A, a hook 234 is formed on the first supporting member 231, a concavity 238 is formed in the second supporting member 235, and the hook 234 is caught in the concavity 238. In FIG. 3B, the first supporting member 331 and the second supporting member 335 are bonded together with a bond 339. In FIGS. 3C and 3D, one of the first supporting member 431 and the second supporting member 435 is larger than the other toward the side and covers the other with both side walls in contact with each other. In FIG. 3E, the first supporting member 531 and the second supporting member 535 are fixed by a stopper 539 inside the liquid crystal display device.

When the first supporting member is mated with the second supporting member in this way, a non-adhesive section is formed in the mated section. The mated section means a section exposed externally in a border section or a section concerning the structure of mating between the first supporting member and the second supporting member. In addition, the non-adhesive section is a section in the mated section with which a bonding member such as the tape 5 above does not make contact when the bonding member is affixed from the outside or a section with which the bonding member may make contact when an external pressure is applied from the outside to the bonding member directly to or indirectly via the bezel 3 or the like.

The non-adhesive section is, for example, the concavity 238 in the embodiment in FIG. 3A, the space between the first supporting member 331 and the second supporting member 335 in the embodiment in FIG. 3B, or a step 438 in FIGS. 3C and 3D. Although a large concavity is not formed in the border between the first supporting member 531 and the second supporting member 535 in the embodiment in FIG. 3E when seen from the outside, if a chamfered section is formed in an edge at the lower end of the first supporting member 531 or an edge at the upper end of the second supporting member 535, the chamfered section is the non-adhesive section. When space is present between the lower end of the first supporting member 531 and the upper end of the second supporting member 535, the non-adhesive section is formed in the space. When a bonding member without non-adhesive region is affixed so as to cover a mated section having such a non-adhesive section, the bonding member may be affixed to the non-adhesive section of the mated section when a pressure is applied to the bonding member from the outside. However, if the non-adhesive region is formed in a region facing the mated section between the first supporting member and the second supporting member on the adhesive surface of the bonding member as in the tape 5 in the above embodiment, it is possible to prevent the bonding member from being affixed to the non-adhesive section of the mated section, thereby preventing degradation of the display quality of the display panel.

The flexible printed circuit substrate 4 may extend in one direction from the extension portion 15 to the outside of the liquid crystal display device L without going around the back surface side of the backlight unit 2. The rear bezel 35 may not have the above proximity section 36.

Although the backlight unit 2 is provided on the back surface side of the liquid crystal cell 1 in the above embodiment, a front light unit may be provided closer to the display surface side than the liquid crystal cell 1 as a light source replacing the backlight unit 2.

Although a liquid crystal display device is described in the above embodiment, other display devices such as, for example, an organic EL display device or plasma display device may have a structure similar to the above. That is, an organic EL display panel or plasma display panel as a display panel may be sandwiched between the first supporting member and the second supporting member described above, and the first supporting member and the second supporting member may be fixed by the tape described above. However, a backlight unit is not necessary in an organic EL display device or plasma display device.

Variations and modifications that can be founded by those skilled in the art within the spirit of the invention also belong to the scope of the invention. For example, embodiments obtained when those skilled in the art makes addition, removal, or design change of components as necessary to the above embodiment are also included in the scope of the invention as long as the spirit of the invention is satisfied. Other effects, provided by the above embodiment, that are clear from description in this specification or can be found by those skilled in the art as necessary are also included in the invention obviously.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
   a display panel;
   a first supporting member and a second supporting member that support the display panel, the first supporting member and the second supporting member being disposed so as to sandwich the display panel from a front surface side and a back surface side, the first supporting member and the second supporting member being mated with each other in a mated section, an end section of the first supporting member and an end section of the second supporting member being in contact with each other; and a bonding member disposed so as to cover the mated section, the bonding member bonding the first supporting member and the second supporting member together, wherein a non-adhesive region is formed in a region on an adhesive surface of the bonding member, the region facing the mated section, and wherein the mated section is formed as a concavity which is recessed inward from a side of the display device, the concavity being formed by recessing inward the end section of the first supporting member or the second supporting member and covering a part of the recessed portion with the end section of the other of the first supporting member or the second supporting member.

2. The display device according to claim 1, wherein the non-adhesive region is formed by removing an adhesive in the region on an adhesive surface of the bonding member.

3. The display device according to claim 1, wherein the non-adhesive region is formed by affixing a protective cover to the region on the adhesive surface of the bonding member.

4. The display device according to claim 3, wherein the protective cover includes a resin film material.

5. The display device according to claim 1, wherein the bonding member includes a conductive material.

* * * * *